US010225114B2

(12) United States Patent
Vakilian et al.

(10) Patent No.: US 10,225,114 B2
(45) Date of Patent: Mar. 5, 2019

(54) SYSTEM FOR RESOLVING CHANNEL SPARSITY IN MULTIPLE-INPUT MULTIPLE-OUTPUT SYSTEMS USING (RE)CONFIGURABLE ANTENNAS, AND METHODS OF MAKING AND USING THE SAME

(71) Applicants: Vida Vakilian, Bakersfield, CA (US); Hani Mehrpouyan, Boise, ID (US); Hamid Jafarkhani, Irvine, CA (US)

(72) Inventors: Vida Vakilian, Bakersfield, CA (US); Hani Mehrpouyan, Boise, ID (US); Hamid Jafarkhani, Irvine, CA (US)

(73) Assignees: CSUB Auxillary For Sponsored Programs Administration, Bakersfield, CA (US); The Regents of the University of California, Oakland, CA (US)

( * ) Notice: Subject to any disclaimer, the term of this patent is extended or adjusted under 35 U.S.C. 154(b) by 0 days.

(21) Appl. No.: 15/284,123

(22) Filed: Oct. 3, 2016

(65) Prior Publication Data
US 2017/0170997 A1 Jun. 15, 2017

Related U.S. Application Data

(60) Provisional application No. 62/236,614, filed on Oct. 2, 2015.

(51) Int. Cl.
*H04L 25/03* (2006.01)
*H04B 7/02* (2018.01)
(Continued)

(52) U.S. Cl.
CPC ......... *H04L 25/03898* (2013.01); *H04B 7/02* (2013.01); *H04B 7/0413* (2013.01); *H04B 7/0482* (2013.01); *H04L 25/03961* (2013.01)

(58) Field of Classification Search
CPC .... H04B 7/0456; H04B 7/0689; H04B 15/00; H04B 7/0452; H04B 7/0602;
(Continued)

(56) References Cited

U.S. PATENT DOCUMENTS

2002/0132600 A1* 9/2002 Rudrapatna ............ H01Q 1/246
455/277.1
2010/0272204 A1 10/2010 Fazel et al.
(Continued)

OTHER PUBLICATIONS

International Search Report and Written Opinion; PCT International Searching Authority dated Jan. 10, 2017; International Application No. PCT/US2016055203; 6 pages; International Searching Authority/ United States, Commissioner for Patents, Alexandria, Virginia.
(Continued)

*Primary Examiner* — Vineeta S Panwalkar
(74) *Attorney, Agent, or Firm* — Andrew D. Fortney; Central California IP Group, P.C.

(57) ABSTRACT

A wireless system, and particularly, a multiple-input multiple-output (MIMO) wireless communication system is disclosed. The wireless system includes a plurality of (re) configurable antennas and a rate-two space coding design for a MIMO system. The MIMO wireless communication system generally includes M (re)configurable antennas configured to independently transmit or broadcast wireless electromagnetic signals having a frequency in the microwave and/or optical ranges, a controller configured to control the (re)configurable antennas, and an encoder configured to encode information onto the wireless electromagnetic signals. The information comprises codewords having N symbols, and the codewords are expressed in an N×M matrix having a non-zero determinant and in which at least one symbol is associated with a coefficient configured to maximize diversity, maximize coding gain
(Continued)

and/or reduce channel fading in the MIMO wireless communication system. M and N are each independently an integer of at least 2.

20 Claims, 5 Drawing Sheets

(51) Int. Cl.
*H04B 7/0456* (2017.01)
*H04B 7/0413* (2017.01)

(58) Field of Classification Search
CPC .. H04B 7/0608; H04B 7/0617; H04B 7/0413; H04B 7/0482; H04B 7/02; H01Q 3/24; H01Q 3/26; H01Q 21/245; H04L 1/0618; H04L 1/0625; H04L 27/2601; H04L 25/03898; H04L 25/03961
See application file for complete search history.

(56) References Cited

U.S. PATENT DOCUMENTS

| 2012/0106613 A1 | 5/2012 | Piazza et al. |
| 2013/0182791 A1 | 7/2013 | Dhakal et al. |
| 2015/0195047 A1* | 7/2015 | Bahl ................ H04B 7/0452 375/267 |

OTHER PUBLICATIONS

Vida Vakilian et al.; "High-Rate Space Coding for Reconfigurable 2 X 2 Millimeter-Wave MIMO Systems"; Cornell University (online); online publication date unknown; 6 pages, May 2015.
International Preliminary Report on Patentability dated Apr. 12, 2018; PCT International Application No. PCT/US2016/055203; 6 pages; The International Bureau of WIPO, Geneva, Switzerland.

* cited by examiner

SYSTEM FOR RESOLVING CHANNEL SPARSITY IN MULTIPLE-INPUT MULTIPLE-OUTPUT SYSTEMS USING (RE)CONFIGURABLE ANTENNAS, AND METHODS OF MAKING AND USING THE SAME

RELATED APPLICATION(S)

This application claims priority to U.S. Provisional Pat. Appl. No. 62/236,614, filed Oct. 2, 2015, incorporated herein by reference.

FIELD OF THE INVENTION

The present invention generally relates to the field of millimeter-wave wireless communications technology. More specifically, embodiments of the present invention pertain to multiple-input multiple-output (MIMO) systems with one or more (re)configurable antennas and methods for enhancing the performance thereof.

DISCUSSION OF THE BACKGROUND

Millimeter-wave links are of a line-of-sight nature. Hence, multiple-input multiple-output (MIMO) systems operating in the millimeter-wave band may not achieve full spatial diversity or multiplexing.

Millimeter-wave (mmWave) technology operating at frequencies in the 30 GHz and 300 GHz range is considered as a potential solution for $5^{th}$ generation (5G) wireless communication systems to support multiple gigabit per second wireless links. The large communication bandwidth at mmWave frequencies will enable mmWave systems to support higher data rates compared to microwave-band wireless systems that have access to very limited bandwidth. However, significant pathloss and hardware limitations are major obstacles to the deployment of mm-wave systems.

In order to combat their relatively high pathloss compared to systems at lower frequencies and the additional losses due to rain and oxygen absorption, mmWave systems require a large directional gain and line-of-sight (LoS) links. This large directional gain can be achieved by beamforming, using either a large antenna array or a single reconfigurable antenna element, which has the capability of forming its beam electronically. Such reconfigurable antennas are available for commercial applications.

As an example, composite right-left handed (CRLH) leaky-wave antennas (LWAs) are a family of reconfigurable antennas with those characteristics. By employing reconfigurable antenna elements where each antenna is capable of configuring its radiation pattern independent of the other antennas in the array, a LoS millimeter-wave multiple-input multiple-output (MIMO) system can achieve both multiplexing and diversity gains. The former will result in better utilization of the bandwidth in this band, while the latter can allow designers to overcome the severe pathloss.

Although the advantages of reconfigurable antennas are well-documented, the space coding designs for MIMO systems are mostly considered based on the assumption that the antenna arrays at the transmitter and the receiver are omnidirectional (i.e., there is no control mechanism over the signal propagation from each antenna element). Deploying reconfigurable antennas in MIMO arrays can add multiple degrees of freedom to the system that can be exploited to design new space coding designs that improve the system performance compared to existing schemes.

In recent years, several block-coding techniques have been designed to improve the performance of MIMO systems employing reconfigurable antennas. There is a coding scheme that can increase the diversity order of conventional MIMO systems by the number of the reconfigurable states at the receiver antenna. The technique has been extended to MIMO systems with reconfigurable antenna elements at both the transmitter and receiver sides, where a state-switching transmission scheme is used to further utilize the available diversity in the system over flat fading wireless channels. However, using such coding schemes, the system is only able to transmit one symbol per channel use (i.e., they do not provide any multiplexing gain). Moreover, the detection complexity of the codes in such schemes is high, and increases with the number reconfigurable states at the antenna.

What is needed is a coding scheme (e.g., a predesigned manipulation of the transmitted signal) for MIMO systems that can transmit multiple symbols per channel.

This "Discussion of the Background" section is provided for background information only. The statements in this "Discussion of the Background" are not an admission that the subject matter disclosed in this "Discussion of the Background" section constitutes prior art to the present disclosure, and no part of this "Discussion of the Background" section may be used as an admission that any part of this application, including this "Discussion of the Background" section, constitutes prior art to the present disclosure.

SUMMARY OF THE INVENTION

The present invention relates in part to a method to utilize (re)configurable antennas and the high antenna directivity in the millimeter-wave band for a rate-two space coding design for 2×2 (or more complex) MIMO systems. Codes formed using the present method and/or design can be decoded with a low-complexity detector at the receiver, and the present method and/or design can enhance the bit-error-rate performance of MIMO systems compared to traditional spatial multiplexing schemes, such as the Vertical Bell Laboratories Layered Space-Time Architecture (VBLAST). Using numerical simulations, the efficiency of the present coding design and method is demonstrated, and the simulations show its superiority compared to existing rate-two space-time block codes.

The present invention relates at least in part to a wireless system having (re)configurable antennas, and a rate-N space coding design for 2×2 (or more complex) MIMO systems, where N is an integer of 2 or more. In one aspect of the invention, the rate-N space coding design has a detection complexity of O(M), where M is the cardinality of the signal constellation. O(M) is a big omicron function (or "big O notation") that describes the limiting behavior of the cardinality of the signal constellation when the argument tends towards a particular value or infinity, and that characterizes the cardinality of the signal constellation according to its growth rate or order.

In another aspect of the invention, N is 2, and the rate-two space coding design c is expressed as:

$$c = \frac{1}{\sqrt{v}} \begin{bmatrix} \alpha_1 s_1 + \beta_1 s_2 \\ \alpha_2 s_1 + \beta_2 s_2 \end{bmatrix}$$

where v is the power normalization factor, $s_1$ and $s_2$ are information symbols from the (re)configurable antennas, and $\alpha_1$, $\beta_1$, $\alpha_2$ and $\beta_2$ are design parameters that are chosen to provide the maximum diversity and coding gain. In one embodiment, the MIMO system is a 2×2 MIMO system. In an additional or alternative embodiment, the (re)configurable antennas are configured to independently transmit or broadcast wireless electromagnetic signals having a frequency in the microwave and/or optical range.

Embodiments of the present invention also relate to a multiple-input multiple-output (MIMO) wireless communication system, comprising M (re)configurable antennas configured to independently transmit or broadcast wireless electromagnetic signals, a controller configured to control a position and/or transmission direction of each of the (re)configurable antennas, and an encoder configured to encode information onto the wireless electromagnetic signals. The wireless electromagnetic signals generally have a frequency in the microwave and optical range (e.g., from 30 GHz to 300 GHz). The information comprises codewords having N symbols, and the codewords are expressed in an N×M matrix having a non-zero determinant and in which at least one symbol is associated with a coefficient configured to maximize diversity, maximize coding gain and/or reduce channel fading in the MIMO wireless communication system. N and M are independently an integer of at least 2.

In various embodiments of the MIMO wireless communication system, the coefficient may be a design parameter value providing the lowest bit error rate when decoding the codewords. In further embodiments, each of the symbols in the matrix may be associated with a coefficient configured to maximize diversity and/or coding gain, one of the coefficients is the design parameter value providing the lowest bit error rate when decoding the codewords, another one of the coefficients is the first coefficient multiplied by $-(-1)^{1/2}$ or a mathematical equivalent thereof, and/or third and fourth ones of the coefficients may be predetermined values (e.g., 1). Alternatively, the third and fourth coefficients may be updated as the signal propagation conditions vary. At least the first and second coefficients (and, in a further embodiment, the first through fourth coefficients) may have values constrained by a power normalization factor of the (re)configurable antennas.

In further embodiments, the MIMO wireless communication system may further comprise a signal processor including or configured to control the encoder and the controller, a plurality of power amplifiers, each configured to amplify an electrical signal with the information encoded thereon from the signal processor, M low pass filters, bandpass filters, and/or band reject filters configured to filter a corresponding one of the electrical signals, M up/down converters configured to convert a corresponding one of the electrical signals to a passband signal and/or a baseband signal, and/or an oscillator configured to provide a periodic signal to the M up/down converters.

The MIMO wireless communication system may also further comprise M receivers configured to receive incoming wireless electromagnetic signals having information encoded thereon. The information on the incoming wireless electromagnetic signals may comprise codewords, a matrix and at least one coefficient encoded in an identical manner as the information encoded by the encoder. Each of the M receivers may comprise a low noise amplifier configured to amplify a received signal with the information encoded thereon from a corresponding (re)configurable antenna, one or more low pass filters, bandpass filters, and/or band reject filters configured to filter a corresponding one of the received signals, and/or an up/down converter configured to convert a corresponding one of the received signals to a passband signal and/or a baseband signal. The oscillator may be configured to provide a periodic signal to all of the up/down converters. The MIMO wireless communication system may also further comprise M switches configured to selectively connect a corresponding one of the (re)configurable antennas to one of the M receivers or to a component providing the information (e.g., from the encoder).

Embodiments of the present invention also relate to a method of transmitting information, comprising constructing a vector for an N×1 codeword containing N symbols, encoding a matrix of the codeword for each of M (re)configurable antennas onto M electrical signals, and wirelessly transmitting the matrix from the (re)configurable antennas. The vector may be constructed and/or the matrix may be encoded using a signal processor. M and N are independently an integer of at least 2. As for the MIMO wireless communication system, the matrix has a non-zero determinant, and at least one of the symbols is associated with a coefficient configured to maximize diversity, maximize coding gain and/or reduce channel fading in a MIMO wireless communication system including the (re)configurable antennas.

Various aspects of the method may be similar or identical to the MIMO wireless communication system. For example, the coefficient may be a design parameter value providing a lowest bit error rate when decoding the codeword, and each of the symbols may be associated with a coefficient configured to maximize diversity and/or coding gain.

However, further embodiments of the method may further comprise receiving a wireless electromagnetic signal with M receiver antennas, the wireless electromagnetic signal having the matrix encoded thereon, and decoding the matrix. In such embodiments, the matrix may be decoded using a maximum likelihood decoder, and the maximum likelihood decoder may decode the matrix using coefficients identical to those in the encoded or transmitted matrix. In still further embodiments, decoding the matrix may comprise computing an intermediate signal from the wireless electromagnetic signal, channel parameters (e.g., of the MIMO wireless communication system) and parameters of the (re)configurable antennas. Optionally, the intermediate signal may be further computed using a power normalization factor of the (re)configurable antennas).

Decoding the matrix may further comprise estimating a first symbol of the codeword from the intermediate signal and/or computing a most likely codeword from the intermediate signal and the estimated first symbol. Computing the most likely codeword may comprise computing a cost function for a next symbol in the codeword, estimating the first symbol and the cost function for remaining constellation points of the matrix, and/or selecting a computed codeword with a minimum cost function as the most likely codeword.

These and other advantages of the present invention will become readily apparent from the detailed description of various embodiments below.

DETAILED DESCRIPTION

Reference will now be made in detail to various embodiments of the invention, examples of which are illustrated in the accompanying drawings. While the invention will be described in conjunction with the following embodiments, it will be understood that the descriptions are not intended to limit the invention to these embodiments. On the contrary, the invention is intended to cover alternatives, modifications and equivalents that may be included within the spirit and scope of the invention as defined by the appended claims. Furthermore, in the following detailed description, numerous specific details are set forth in order to provide a thorough understanding of the present invention. However, it will be readily apparent to one skilled in the art that the present invention may be practiced without these specific details. In other instances, well-known methods, procedures, components, and circuits have not been described in detail so as not to unnecessarily obscure aspects of the present invention.

The technical proposal(s) of embodiments of the present invention will be fully and clearly described in conjunction with the drawings in the following embodiments. It will be understood that the descriptions are not intended to limit the invention to these embodiments. Based on the described embodiments of the present invention, other embodiments can be obtained by one skilled in the art without creative contribution and are in the scope of legal protection given to the present invention.

Furthermore, all characteristics, measures or processes disclosed in this document, except characteristics and/or processes that are mutually exclusive, can be combined in any manner and in any combination possible. Any characteristic disclosed in the present specification, claims, Abstract and Figures can be replaced by other equivalent characteristics or characteristics with similar objectives, purposes and/or functions, unless specified otherwise.

For the sake of convenience and simplicity, the terms "connected to," "coupled with," "coupled to," and "in communication with" are generally used interchangeably herein, but are generally given their art-recognized meanings. The term "(re)configurable" means configurable or reconfigurable.

A number shown in parentheticals (i.e., "(1)" or "(2)") refers to an algorithm, function, or equation as labeled in the application.

The term "algorithm" as used in this application may refer to a set of steps that are followed in order to solve a mathematical problem or to complete a computed process.

The term "equation" as used in this application may refer to a formal or substantially formal statement of the equivalence of a mathematical or logical expression.

The term "code" as used in this application may refer to a set of instructions for an electronic computing device.

Capital boldface letters (e.g., X) are generally used for matrices, and lowercase boldface letters (e.g., x) are generally used for vectors. $(.)^T$ denotes a transpose operator. $A \circ B$ denotes a Hadamard product (e.g., element-wise matrix multiplication) of the matrices A and B, $\|A\|_F$ represents the Frobenius norm of the matrix A, $\det(\|)$ computes the determinant of the matrix A, and vec(A) denotes the vectorization of a matrix A by stacking its columns on top of one another. Moreover, $\text{diag}(a_1, a_2, \ldots, a_n)$ represents a diagonal n×n matrix, whose diagonal entries are $a_1, a_2, \ldots, a_n$. $I_M$ denotes the identity matrix of size M×M. Finally, C denotes the set of complex valued numbers.

The invention, in its various aspects, will be explained in greater detail below with regard to exemplary embodiments.

Figure 1:
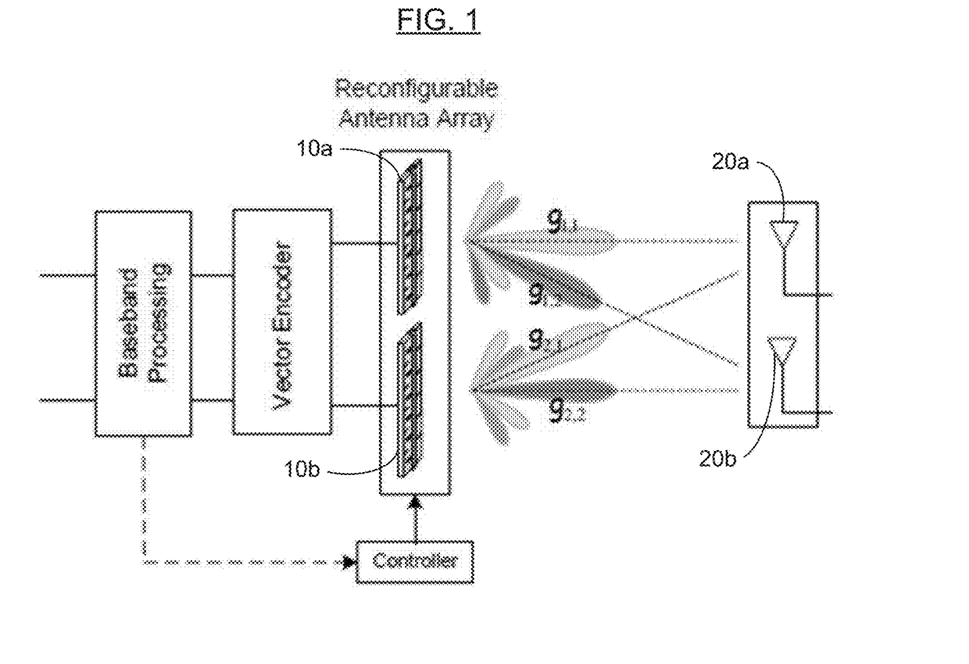
FIG. 1 shows a schematic depiction of an exemplary (re)configurable MIMO system transmitter.

A rate-two space encoder for 2×2 MIMO systems equipped with (re)configurable transmit antennas is disclosed. The present encoder uses the properties of (re)configurable antennas to achieve multiplexing gain, while reducing the complexity of the maximum-likelihood (ML) detector at the receiver. Compared to previously space coding schemes outlined below, the present design utilizes the (re)configurability of the antennas to increase bandwidth efficiency, enhance reliability, and reduce detection complexity at the receiver. In fact, the present encoder has a detection complexity of O(M), where M is the cardinality of the signal constellation. These advantages are made possible since the high antenna directivity at mmWave frequencies and the (re)configurability of the antennas 10a-b are utilized to ensure that the beams from each (re)configurable antenna 10a, 10b are directed at a receive antenna 20a, 20b as shown in FIG. 1. Hence, in a 2×2 MIMO system, the present approach can generate four beams for each transmit-to-receive antenna pair that can be modified via the parameters of the (re)configurable antennas 10a-b. In a more complex system (e.g., a 3×3 MIMO system), the present approach can generate nine beams for each transmit-to-receive antenna pair that can be modified via the parameters of the (re)configurable antennas. On the other hand, conventional MIMO beamforming schemes for omnidirectional antennas can generate a maximum of two beams in a similar setup.

For comparison purposes, the performance of the present encoder was compared against the Vertical Bell Laboratories Layered Space-Time (VBLAST) architecture for detection via successive interference cancellation (SIC) and ML. The results of the comparison demonstrate that the present approach can outperform SIC- and ML-VBLAST, while requiring no additional decoding complexity at the receiver as SIC-VBLAST.

The performance of recently developed rate-2 space-time block codes (STBCs), including the Matrix C and maximum transmit diversity (MTD) codes, were also studied. The Matrix C code is a threaded algebraic space-time code, which is known as a well-performing STBC for 2×2 MIMO systems. However, the ML decoding complexity of this code is very high (i.e., $O(M^4)$, an order of four). Similarly, the MTD code has an ML detection complexity of $O(M^2)$. Although a rate-2 STBC for MIMO systems equipped with reconfigurable antennas is known, the detection complexity of the present code is on the order of $O(M^2)$. Furthermore, the known rate-2 STBC for MIMO systems equipped with reconfigurable antennas is based on an assumption that the radiation pattern of each reconfigurable antenna consists of a single main lope with negligible side lopes. Thus, by not utilizing the side lopes, the higher detection complexity of the known rate-2 STBC code does not translate into better overall system performance.

Below, the system and signal model are described, the present high-rate code for 2×2 MIMO systems is introduced, the design criteria of the present code are described, and a low complexity ML decoder for the present code is disclosed. Simulation results are also presented, as are embodiments of wireless systems employing the present code.

System Model and Definitions

A MIMO system with $N_t$=2 transmit and $N_r$=2 receive antennas is considered (e.g., as a model for the invention). The transmit antennas 10a-b are assumed to be (re)configurable with controllable radiation patterns, and the receive antennas 20a-b are assumed to be omni-directional (see FIG. 1). Due to the utilization of the mmWave band, one can assume that the wireless channels between each pair of the transmit and receive antennas are Rician flat fading (a combination of line-of-sight and none-line-of-sight). Based on the above assumptions, the received signal can be expressed as shown in Equation (1) below.

$$y = H_g c + z \quad (1)$$

where $c=[c_1, c_2, \ldots, c_{Nt}]^T \in C^{N_t \times 1}$ is the transmitted code vector, $z \in C^{N_r \times 1}$ is a zero-mean complex white Gaussian noise matrix consisting of components with identical power $N_0$, and $H_g \in C^{N_r \times N_t}$ is the Hadamard product of the channel matrix H and the (re)configurable antenna parameter matrix G, i.e.:

$$H_g = H \circ G \quad (2)$$

In Equation (2) above, $H \triangleq [h_1, \ldots, h_{Nt}]$ with $h_j \triangleq [h_{1,j}, \ldots, h_{Nr,j}]^T$, and $G \triangleq [g_1, \ldots, g_{Nt}]$ with $g_j \triangleq [g_{1,j}, \ldots, g_{Nr,j}]^T$. Here, $h_{i,j}$ and $g_{i,j}$ denote the channel and (re)configurable antenna parameters corresponding to the ith and jth receive and transmit antennas, respectively. Note that since the radiation pattern towards each receive antenna 20a, 20b can be modified independent of the other antennas, a Hadamard product instead of a general vector multiplication is used in Equation (2).

A "transmission rate" may be defined as follows. If $N_s$ information symbols in a codeword are transmitted over T channel uses, the transmission symbol rate is defined as $$r_s = \frac{N_s}{T}$$

and the bit rate per channel use is then given by $$r_b = r_s \log_2 M$$

where M is the cardinality of the signal constellation.

A "Maximum-likelihood decoding complexity" may be defined as follows. The maximum-likelihood decoding metric that is to be minimized over all possible values of a codeword c is given by $$[\hat{c}_1, \ldots, \hat{c}_{N_t}] = \underset{c_1, \ldots, c_{N_t}}{\operatorname{argmin}} \|y - H_g c\|^2 \quad (3)$$

If we assume that there are $N_s$ symbols to be transmitted in each codeword, then the ML decoder complexity will be $O(M^{N_s})$ for joint data detection. As will be shown below, the ML complexity of the present code can be reduced to $O(M)$ using the structure of the code and the (re)configurable feature of the antennas.

Code Construction of the Present High-Rate Code for 2×2 MIMO Systems

In a 2×2 MIMO system, every 2×1 codeword vector may be constructed from two information symbols {s1; s2} that will be sent from $N_t$=2 (re)configurable antennas. The present codeword (represented by an exemplary codeword c) can be expressed as $$c = \frac{1}{\sqrt{\nu}} \begin{bmatrix} \alpha_1 & \beta_1 \\ \alpha_2 & \beta_2 \end{bmatrix} s$$

where $s=[s_1, s_2]^T$ and is a transmit symbol vector. Therefore, the codeword c is given by $$c = \frac{1}{\sqrt{\nu}} \begin{bmatrix} \alpha_1 s_1 + \beta_1 s_2 \\ \alpha_2 s_1 + \beta_2 s_2 \end{bmatrix} \quad (4)$$

where $\nu$ is the power normalization factor and $\alpha_1, \beta_1, \alpha_2$ and $\beta_2$ are design parameters that are chosen to provide the maximum diversity and coding gain.

Design Criteria

The diversity order of the present code and the mechanism for obtaining the optimal values for and $\alpha_1, \beta_1, \alpha_2$ and $\beta_2$ may be, but is not limited to, the following.

To compute the achievable diversity gain of the present code, consider two distinct codewords c and u that are constructed using Equation (4) as:

$$c = \frac{1}{\sqrt{\nu}} \begin{bmatrix} \alpha_1 s_1 + \beta_1 s_2 \\ \alpha_2 s_1 + \beta_2 s_2 \end{bmatrix}$$

$$u = \frac{1}{\sqrt{\nu}} \begin{bmatrix} \alpha_1 u_1 + \beta_1 u_2 \\ \alpha_2 u_1 + \beta_2 u_2 \end{bmatrix}$$

The pairwise error probability (PEP) of the above code can be expressed as $$P(C \to U \mid h_g) = Q\left(\sqrt{\frac{\gamma}{4} \|(C-U)h_g\|^2}\right) \quad (5)$$

where $c=(I_2 \otimes c^T)$, $u=(I_2 \otimes u^T)$, $h_g=\operatorname{vec}(H_g)$ and $\gamma$ is the received signal-to-noise ratio (SNR). By applying the Chernoff upper bound, $Q(x) \le \frac{1}{2} e^{-x^2/2}$, and calculating the expected value of the upper bound, the pairwise error probability for the present code can be upper-bounded by:

$$P(C \to U) \le \frac{1}{\det(I_4 + (\gamma/4)(R_{h_g}(C-U)^H(C-U))}$$

where $R_{h_g} = \{h_g h_g^H\}$. At high SNR, the above equation can be simplified to:

$$P(C \rightarrow U) \leq \frac{1}{(\gamma/4)^r \prod_{i=1}^{r} \lambda_i} \quad (6)$$

where $\lambda_i$ and $r$ are the i-th eigenvalue and the rank of the matrix $R_{h_g}(C-U)^H(C-U)$, respectively. In other words, $r$ denotes the diversity gain of the present code, which in this example can be at a maximum $N_r=2$.

To find the parameters of the (re)configurable antennas and that of the codes, we rewrite the received signal equation (1) as:

$$y = H_g s + z$$

where $$H_g \triangleq \begin{bmatrix} \alpha_1 h_{1,1} g_{1,1} + \alpha_2 h_{1,2} g_{1,2} & \beta_1 h_{1,1} g_{1,1} + \beta_2 h_{1,2} g_{1,2} \\ \alpha_1 h_{2,1} g_{2,1} + \alpha_2 h_{2,2} g_{2,2} & \beta_1 h_{2,1} g_{2,1} + \beta_2 h_{2,2} g_{2,2} \end{bmatrix}$$

We assume that the channel state information (CSI) is known at the transmitter. In time-division-duplex (TDD) systems, the CSI of the uplink can be used as the CSI for the downlink due to channel reciprocity. In such a setup, no receiver feedback is required. In order to achieve full diversity, the matrix $H_g$ must be full rank, or equivalently, its determinant must be nonzero. This condition may not be satisfied for MIMO mmWave systems due to the LoS nature of the link. However, using (re)configurable antennas and (optionally) beam steering, one can ensure that the determinant of $H_g$—the equivalent channel matrix for the exemplary (re)configurable 2×2 MIMO system—is nonzero.

The determinant of $H_g$ for a 2×2 MIMO system is given by the following equation:

$$det(H_g) = (\alpha_1\beta_2 - \alpha_2\beta_1)(h_{1,1}g_{1,1}h_{2,2}g_{2,2} - h_{1,2}g_{1,2}h_{2,1}g_{2,1}) \quad (7)$$

The constraint $det(H_g) \neq 0$ leads to the following two constraints:

$$(\alpha_1\beta_2 - \alpha_2\beta_1) \neq 0 \quad (8a)$$

$$(h_{1,1}g_{1,1}h_{2,2}g_{2,2} - h_{1,2}g_{1,2}h_{2,1}g_{2,1}) \neq 0 \quad (8b)$$

For constraint (8a) to be nonzero, we must have $$\alpha_1\beta_2 \neq \alpha_2\beta_1 \quad (8a)$$

In addition, to control and limit the transmit power of the antennas, the following constraint must be satisfied:

$$|\alpha_1|^2 + |\beta_1|^2 = |\alpha_2|^2 + |\beta_2|^2 = v \quad (10)$$

Figure 2:
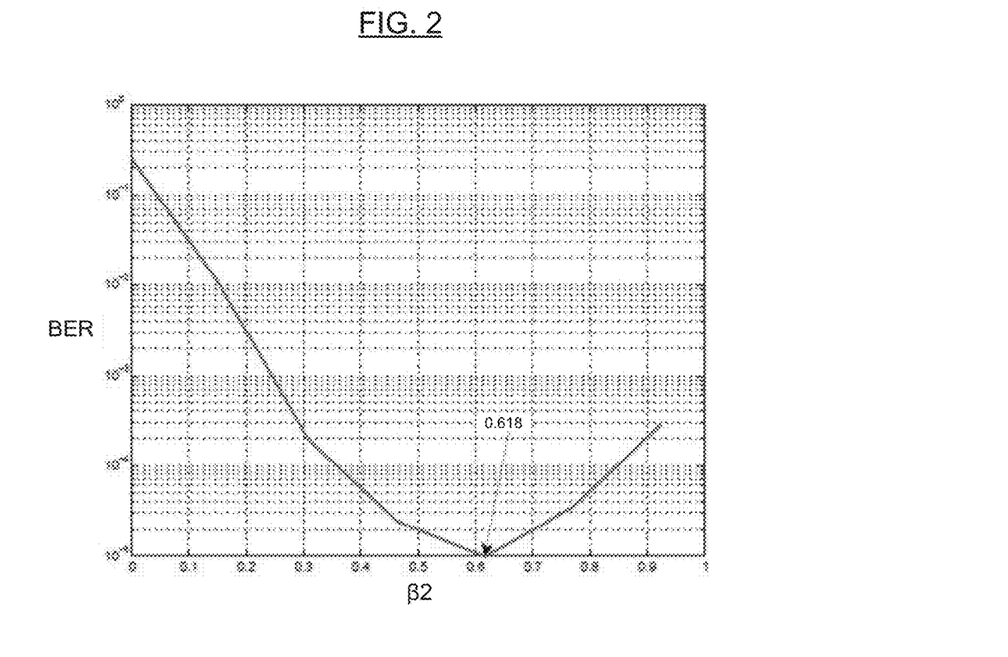
FIG. 2 shows a curve comparing the bit error rate (BER) to signal to noise ratio (SNR) for 4-QAM modulation.

Without loss of generality, $\alpha_1$ and $\alpha_2$ are set to 1 ($\alpha_1 = \alpha_2 = 1$). From constraint (9) and constraint (10), we obtain $$\beta_1 = -j\beta_2$$

where $j = \sqrt{-1}$ is the imaginary unit. $\beta_2$ can be determined analytically by expressing the BER of the system in terms of $\beta_2$ and minimizing it over this parameter. This parameter can also be computed using numerical simulations for a given SNR value. Using the numerical approach, one obtains $\beta_2 = 0.618$ for four-state quadrature amplitude modulation (4-QAM) signaling at an SNR of 20 dB (see FIG. 2).

The parameters of the (re)configurable antennas at the transmitter must be chosen to satisfy constraint (8b) and to reduce the effects of channel fading. As such, the parameters $g_{i,j}$ for i, j={1, 2} are selected as:

$$g_{1,j} = h_{1,j}^* / (|h_{1,1}|^2 + |h_{1,2}|^2), \quad (11a)$$

$$g_{2,j} = (-1)^j h_{2,j}^* / (|h_{2,1}|^2 + |h_{2,2}|^2) \quad (11b)$$

It can be straightforwardly shown that due to the choice of (re)configurable antenna parameters shown in (11a) or (11b), constraint (8b) is satisfied even when the channel matrix, H, is not full-rank due to the LoS nature of the mmWave links.

A Low Complexity ML Decoder for the Present Coding Design

ML decoders in general perform an exhaustive search over all possible values of the transmitted symbols and decides in favor of the quadruplet ($s_1$, $s_2$) that minimizes the Euclidean distance metric of Equation (3) for a 2×2 system. The computational complexity of the receiver in this case is $O(M^2)$. As will be shown herein, the ML decoding complexity of the present code design can be further decreased to $O(M)$.

Conditional ML Decoding

To reduce the decoding complexity of the present coding design, a conditional ML decoding technique was used. Note that, $\alpha_1$ and $\alpha_2$ are set to 1 ($\alpha_1 = \alpha_2 = 1$) as explained above. The following intermediate signals were computed using the received signals $y_1$ and $y_2$ according to Equation (12):

$$\begin{cases} y_1 = \frac{1}{\sqrt{v}} h_{1,1} g_{1,1}(s_1 + \beta_1 s_2) + \frac{1}{\sqrt{v}} h_{1,2} g_{1,2}(1)(s_1 + \beta_2 s_2) + z_1 \\ y_2 = \frac{1}{\sqrt{v}} h_{2,1} g_{2,1}(s_1 + \beta_1 s_2) + \frac{1}{\sqrt{v}} h_{2,2} g_{2,2}(1)(s_1 + \beta_2 s_2) + z_2 \end{cases} \quad (12)$$

for a given value of the symbol $s_2$:

$$r_1 = y_1 - \frac{1}{\sqrt{v}}(h_{1,1}g_{1,1}\beta_1 s_2 + h_{1,2}g_{1,2}\beta_2 s_2) \quad (13)$$

$$= \frac{1}{\sqrt{v}}(h_{1,1}g_{1,1} + h_{1,2}g_{1,2}) + s_1 + z_1$$

$$r_2 = y_2 - \frac{1}{\sqrt{v}}(h_{2,1}g_{2,1}\beta_1 s_2 + h_{2,2}g_{2,2}\beta_2 s_2) \quad (14)$$

$$= \frac{1}{\sqrt{v}}(h_{2,1}g_{2,1} + h_{2,2}g_{2,2}) + s_1 + z_2.$$

Now, we form the intermediate signal, $\tilde{r} = r_1 + r_2$, as $$\tilde{r} = \frac{1}{\sqrt{v}}(h_{1,1}g_{1,1} + h_{1,2}g_{1,2} + h_{2,1}g_{2,1} + h_{2,2}g_{2,2})s_1 + \tilde{z} \quad (15)$$

where $\tilde{z} = z_1 + z_2$ is the combined noise term. By plugging Equations (11a) and (11b) in Equation (15), we arrive at:

$$\tilde{r} = \frac{1}{\sqrt{v}}\left(\sqrt{|h_{1,1}|^2 + |h_{1,2}|^2} + \sqrt{|h_{2,2}|^2 + |h_{2,1}|^2}\right)s_1 + \tilde{z} \quad (16)$$

It can be seen from equation (16) that $\tilde{r}$ has only terms involving the symbol $s_1$, and therefore, it can be used as the input signal to a threshold detector to get the ML estimate of the symbol $s_1$ conditional on $s_2$. As a result, instead of minimizing the cost function in Equation (3) over all possible pairs ($s_1$, $s_2$), we first obtain the estimate of $s_1$ using a threshold detector $s_1^{ML}(s_2^m)$, and then compute Equation (3) for $(s_1^{ML}(s_2^m), s_2^m)$, for m=1, 2, ..., M. The optimal solution can be obtained as $$\hat{s}_2 = \arg\min_m f(s_1^{ML}(s_2^m), s_2^m) \quad (17)$$

where $$f(s_1^{ML}(s_2^m), s_2^m) = \left| y_1 - \frac{1}{\sqrt{v}} h_{1,1} g_{1,1}(s_1^{ML}(s_2^m) + \beta_1 s_2^m) - \frac{1}{\sqrt{v}} h_{1,2} g_{1,2}(s_1^{ML}(s_2^m) + \beta_2 s_2^m) \right|^2 + \left| y_2 - \frac{1}{\sqrt{v}} h_{1,2} g_{1,2}(s_1^{ML}(s_2^m) + \beta_1 s_2^m) - \frac{1}{\sqrt{v}} h_{2,2} g_{2,2}(s_1^{ML}(s_2^m) + \beta_2 s_2^m) \right|^2 \quad (18)$$

Using the conditional ML decoding described in Equations (17) and (18), we reduce the ML detection complexity of the present code from $O(M^2)$ to $O(M)$ (see Algorithm 1 below).

---
Algorithm 1 Conditional ML Decoding
---
Step 1: Select $s_2^m$ from the signal constellation set.
Step 2: Compute $\tilde{r} = r_1 + r_2$.
Step 3: Supply $\tilde{r}$ into a phase threshold detector to get the estimate of $s_1$ conditional on $s_2^m$, called $s_1^{ML}(s_2^m)$.
Step 4: Compute the cost function in (18) for $s_1^{ML}(s_2^m)$ and $s_2^m$.
Step 5: Repeat Step 1 to Step 4 for all the remaining constellation points.
Step 6: The $s_1^{ML}(s_2^m)$ and $s_2^m$ corresponding to cost function with minimum value will be the estimate of $s_1$ and $s_2$.

Decoding Complexity Analysis

The computational complexity of the present conditional ML decoding was compared with that of traditional ML decoding. A simple measure to rate the complexity of any receiver is the number of complex Euclidean distances to compute. This is approximately proportional to the number of multiplications, which is generally more process-intensive than additions. In Table I below, the number of arithmetic operations required by traditional and the present conditional ML detectors are summarized for a 2×2 MIMO system with a signal constellation of size M.

TABLE I

Computational complexity comparison

| Traditional ML Decoding | Conditional ML Decoding |
|---|---|
| $\begin{pmatrix} 8 \text{ Multiplications} \\ 4 \text{ Subtractions} \\ 5 \text{ additions} \\ 2 \text{ Squares} \end{pmatrix} \times M^2$ | $\begin{pmatrix} 8 \text{ Multiplications} \\ 4 \text{ Subtractions} \\ 5 \text{ additions} \\ 2 \text{ Squares} \end{pmatrix} \times M$ |
| $(M^2 - 1)$ Comparisons | $(M^2 - 1)$ Comparisons |

Simulation Results

The results of the numerical simulation demonstrate the performance of the present coding scheme. The coding scheme is compared to the existing rate-two methods in the literature. In particular, the BER performance of the present code design was compared with the VBLAST, Matrix C, and MTD schemes. Throughout the simulations, a 2×2 MIMO structure was assumed, and a 4-QAM constellation was used for symbol transmissions. A Rician fading channel model was considered with the following form:

$$H = \sqrt{\frac{K}{K+1}} H_L + \sqrt{\frac{1}{K+1}} H_w \quad (19)$$

where K is the Rician K-factor expressing the ratio of powers of the free-space signal and the scattered waves. Using this model, H is decomposed into the sum of a random component matrix $H_w$ and the deterministic component $H_L$. The former ($H_w$) accounts for the scattered signals with its entries being modeled as independent and identically distributed (i.i.d) complex Gaussian random variables with zero mean and unit variance. The latter ($H_L$) models the LoS signals. In the simulations, the entries of matrix $H_L$ are all set to one. This choice is motivated by the fact that optimal LoS MIMO channels are highly dependent on (1) the distance between the transmitter and receiver and (2) the antenna spacing. These conditions cannot be easily satisfied in mobile cellular networks. Hence, here, an ill-condition LoS channel has been considered.

Figure 3:
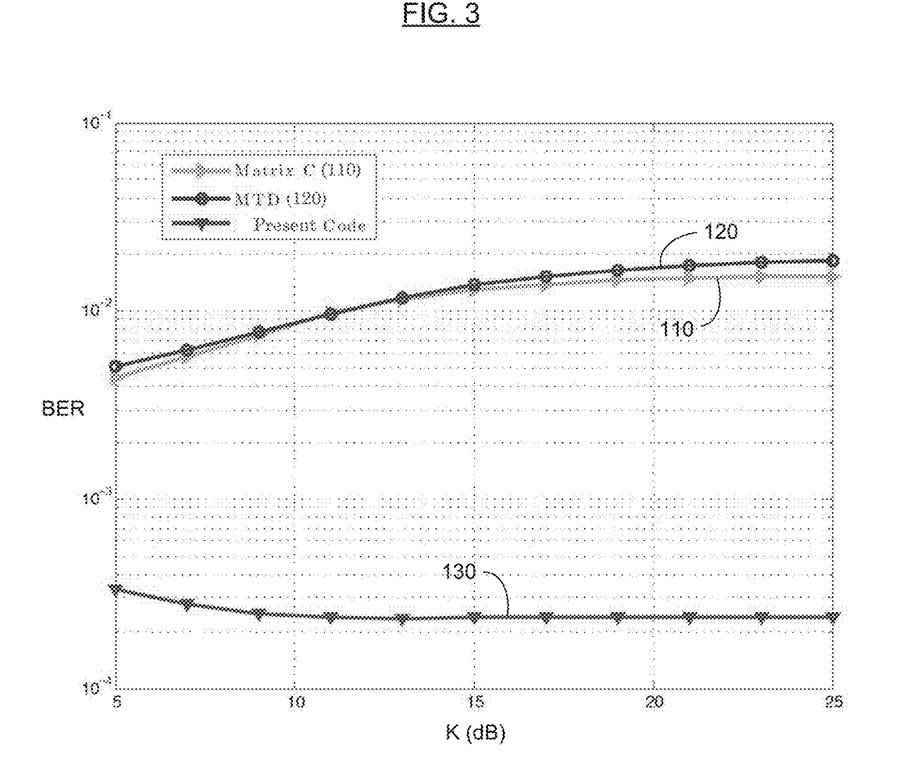
FIG. 3 shows a curve displaying the BER performance of an example of the present space code, the Matrix C, and MTD versus K, the Rician factor.

FIG. 3 shows the BER of the present space code (curve 130), the Matrix C (curve 110), and MTD (curve 120) versus K, the Rician factor. The BER of Matrix C 110 and MTD 120 degrades as K increases, since as K→∞, the random component of the channel vanishes. Consequently, the channels reduce to $H_L$. Under this condition, the channel becomes ill-conditioned as its covariance is low-rank. However, by reconfiguring the radiation pattern of each transmitting antenna pair (e.g., 10a-b in FIG. 1), the present space codes can maintain a full-rank channel even when K→∞. Hence, as shown in FIG. 3, the BER performance of the present code remains invariant respect to changes in K, which is a key advantage of the present scheme for mm-wave wireless communications applications.

Figure 4:
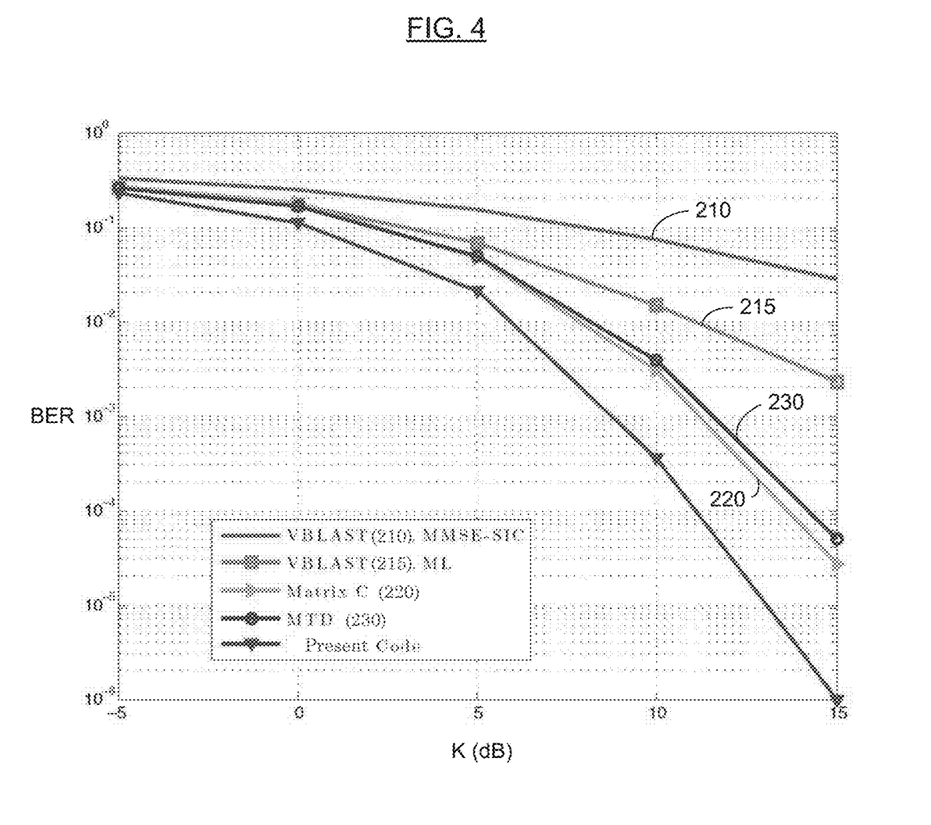
FIG. 4 shows the BER performance of an example of the present code with spectral efficiency of 4 bits per time slot in Rician fading channels.

FIG. 4 illustrates the BER performance of the present code design in comparison with the performance of two VBLAST schemes 210 and 215 and the aforementioned rate-two STBCs over a Rician fading channel with a K-factor equal to 2 dB. FIG. 4 shows that the present code outperforms all the considered codes. The second best performing code in this graph is Matrix C 220, which is included in the IEEE 802.16e-2005 specification. As this result indicates, at a BER of $10^{-4}$, the performance advantage of the present code compared with that of Matrix C 220 is about 2:5 dB. It also can be seen from this figure that at a BER of $10^{-3}$, the present code achieves more than a 7 dB gain compared to the VBLAST scheme 215 with ML decoding.

In Table II below, the ML decoding complexity of the present code is compared with those of Matrix C, MTD, and VBLAST for a 2×2 MIMO system. As shown in Table II, the decoding complexity of the present code is O(M), which is substantially lower than the other codes.

TABLE II

Comparison of coding rate and ML decoding complexity

| Coding Scheme | Symbol rate ($r_s$) | Complexity |
|---|---|---|
| Proposed code | 2 | O(M) |
| Matrix C | 2 | $O(M^4)$ |
| MTD | 2 | $O(M^2)$ |
| VBLAST | 2 | $O(M^2)$ |

Figure 5:
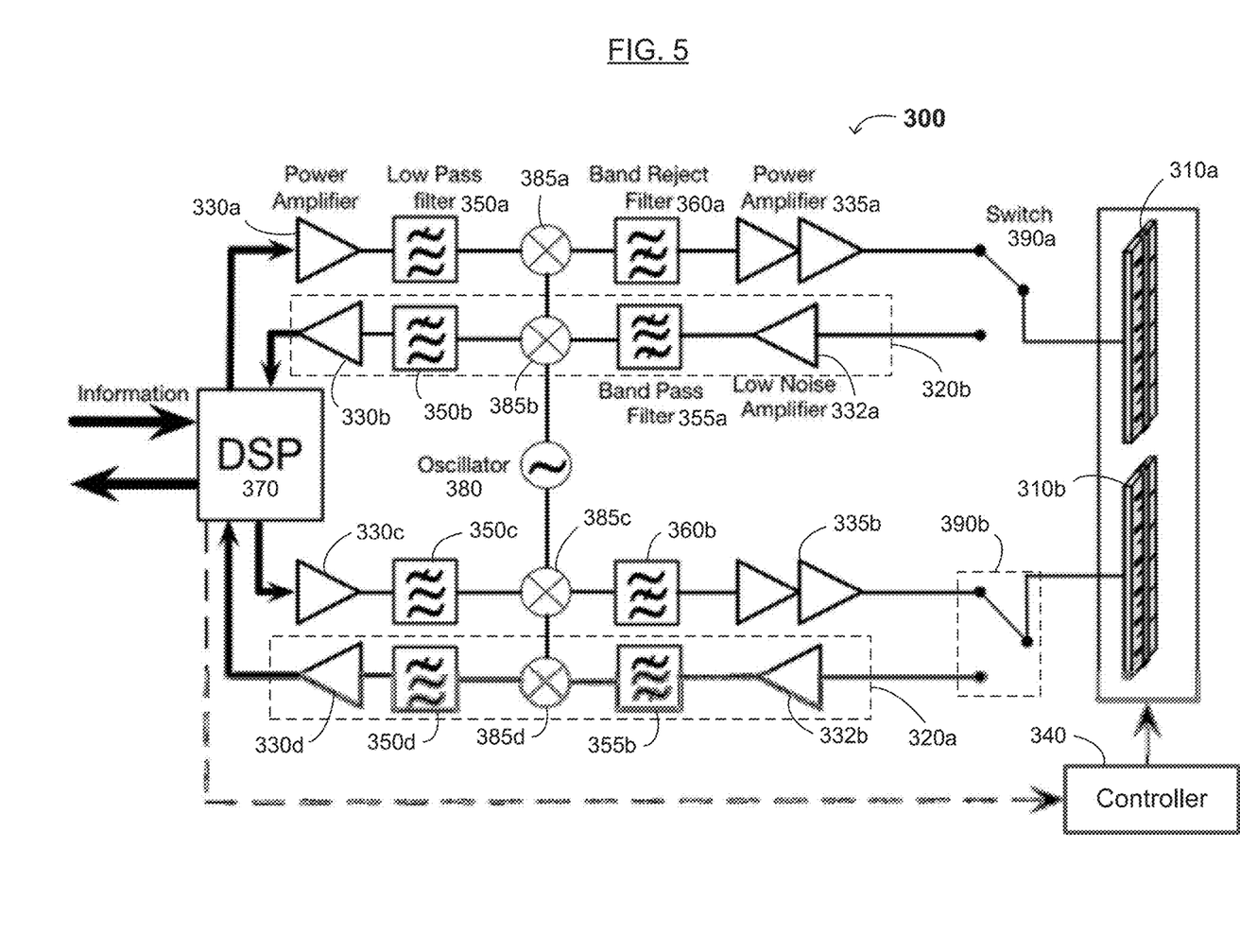
FIG. 5 shows a schematic or diagram of an exemplary hardware structure for a MIMO systems using (re)configurable antennas.

Embodiments of Wireless Systems Employing (Re)Configurable Antennas and the Present Code FIG. 5 shows an exemplary wireless system 300 employing (re)configurable antennas 310a-b and a rate-two space code. Such a coding design can be advantageous for mmWave systems, since it can allow for LoS-MIMO systems deployed in this band to achieve both spatial diversity and multiplexing. Moreover, due to the structure of the present code and the (re)configurability of the antennas 310a-b, the ML detection complexity is reduced to O(M), which has significant impact on the energy consumption of the receiver(s) 320a-b, especially when using a higher-order modulation scheme.

As shown in FIG. 5, the wireless system 300 employing (re)configurable antennas 310a-b and the present code may further include one or more of the following hardware components: power amplifiers 330a-d and 335a-b, low noise amplifiers 332a-b, a controller 340 for the (re)configurable antennas 310a-b, low pass filters 350a-d, bandpass filters 355a-b, band reject filters 360a-b, a digital signal processing unit 370, an oscillator 380, RF switches 390a-b, and up/down converters 385a-d for converting a signal to a passband signal and/or to a baseband signal (e.g., by down converting). The code may be uploaded into the digital signal processor (DSP) 370 by a connection from a computer to the DSP (which may be a discrete chip or device).

Figure 6A:
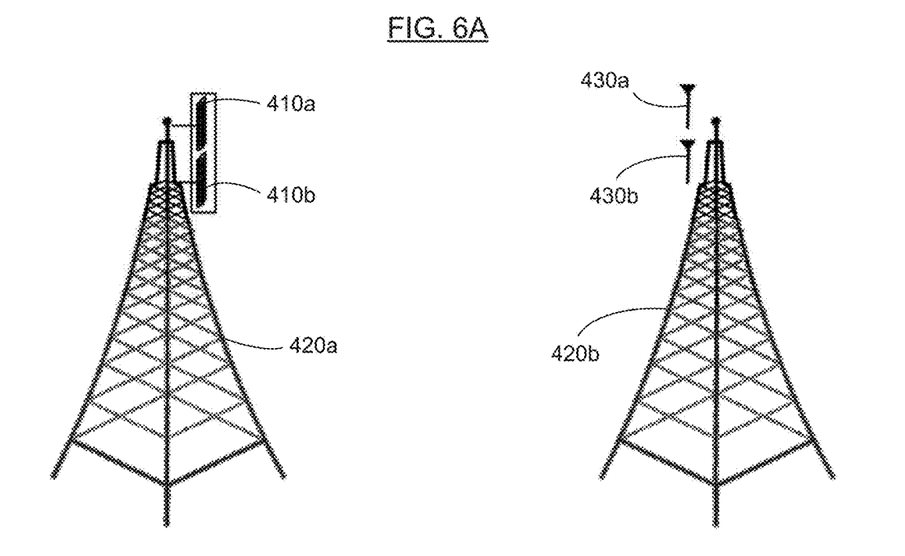
FIG. 6A shows a schematic or diagram for an exemplary system (or a setup therefor) when interconnecting two endpoints.
Figure 6B:
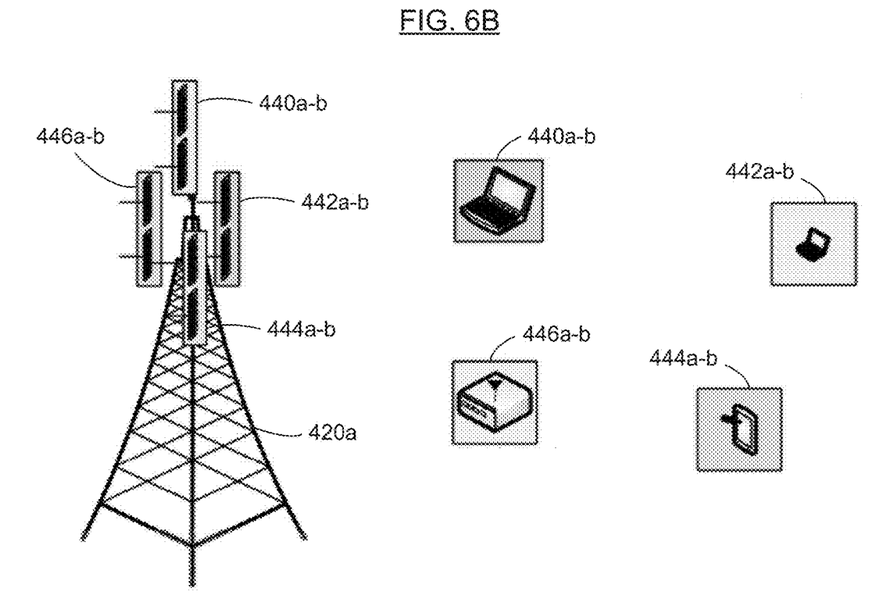
FIG. 6B shows a diagram for an exemplary system when applied in a multi-user environment interconnecting multiple endpoints.

As shown in FIG. 6A and FIG. 6B, the wireless system or network using the present invention can be set up in at least two approaches. First, as shown in FIG. 6A, the present system can be utilized to interconnect to endpoints, which can comprise a base station, an access point, two enterprises, or any two endpoints that are configured to communicate and transfer information between and/or amongst each other. The information is communicated from (re)configurable antennas 410a-b on a first tower 420a to receiving antennas 430a-b on a second tower 420b.

Secondly, as shown in FIG. 6B, the system can be used to interconnect multiple users to the same endpoint, which can be a base station or access point. This can be accomplished by using multiple sets of antennas 440a-b, 442a-b, 444a-b and 446a-b at the access point or base station on or near a tower 450, via time division duplexing with a single set of (re)configurable antennas at the base station or access point, or via any other multiple access mechanism that allows the (re)configurable antennas 440a-b, 442a-b, 444a-b and 446a-b to establish a link with each of the users 460, 462, 464 and 466, which may comprise a laptop computer, tablet computer, smart phone, wireless router or server, etc.

CONCLUSION/SUMMARY

A rate-two space code for wireless systems employing (re)configurable antennas is disclosed. Simulation results are provided that demonstrate the performance of the present code, and comparisons are made with previous coding schemes. As the results herein indicate, the BER performance of the present code outperforms the rate-two STBCs and the VBLAST scheme. However, channel and/or direction of arrival estimation errors, phase noise, amplifier nonlinearity, and/or other issues pertaining to mmWave systems may also be considered and/or optimized to fully determine the potential of such 2×2 MIMO systems in this band.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed, and that modifications and other embodiments are intended to be included within the scope of the appended claims. Although specific terms are employed herein, they are used in a generic and descriptive sense only, and not for purposes of limitation.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A multiple-input multiple-output (MIMO) wireless communication system, comprising:
   a) M (re)configurable antennas configured to independently transmit or broadcast wireless electromagnetic signals having a frequency in the microwave or optical range, wherein M is an integer of at least 2;
   b) a controller configured to control a position and/or transmission direction of each of the (re)configurable antennas; and
   c) an encoder configured to encode information onto the wireless electromagnetic signals, wherein the information comprises codewords having N symbols, N is an integer of at least 2, and the codewords are expressed in an N×M matrix having a non-zero determinant and in which at least one symbol is associated with a first coefficient configured to maximize diversity, maximize coding gain and/or reduce channel fading in the MIMO wireless communication system, wherein the first coefficient is a design parameter value providing a lowest bit error rate when decoding the codewords.

2. The MIMO wireless communication system of claim 1, wherein each of the symbols are associated with a coefficient configured to maximize diversity and/or coding gain.

3. The MIMO wireless communication system of claim 2, wherein a second one of the coefficients is the first one of the coefficients multiplied by $-(-1)^{1/2}$ or a mathematical equivalent thereof.

4. The MIMO wireless communication system of claim 3, wherein third and fourth ones of the coefficients are predetermined values or are updated as the signal propagation conditions vary.

5. The MIMO wireless communication system of claim 3, wherein at least the first and second ones of the coefficients have values constrained by a power normalization factor of the (re)configurable antennas.

6. The MIMO wireless communication system of claim 1, further comprising a signal processor including or configured to control the encoder and the controller.

7. The MIMO wireless communication system of claim 1, further comprising M receivers configured to receive incoming wireless electromagnetic signals having information encoded thereon, the information on the incoming wireless electromagnetic signals comprising codewords, a matrix and at least one coefficient encoded in an identical manner as the information encoded by the encoder.

8. The MIMO wireless communication system of claim 7, further comprising M switches configured to selectively connect a corresponding one of the (re)configurable antennas to one of the M receivers or to a component providing the information.

9. A method of transmitting information, comprising:
   a) using a signal processor, constructing a vector for an N×1 codeword containing N symbols, wherein N is an integer of at least 2;
   b) using the signal processor, encoding a matrix of the codeword for each of M (re)configurable antennas onto M electrical signals, wherein M is an integer of at least 2, the matrix has a non-zero determinant, at least one of the symbols is associated with a coefficient configured to maximize diversity, maximize coding gain and/or reduce channel fading in a multiple-input multiple-output (MIMO) wireless communication system including the (re)configurable antennas, and a first one of the coefficients is a design parameter value providing a lowest bit error rate when decoding the codewords; and
   c) wirelessly transmitting the matrix from the (re)configurable antennas.

10. The method of claim 9, wherein each of the symbols are associated with a coefficient configured to maximize diversity and/or coding gain.

11. The method of claim 10, wherein a second one of the coefficients is the first one of the coefficients multiplied by $-(-1)^{1/2}$ or a mathematical equivalent thereof.

12. The method of claim 11, wherein the first through fourth ones of the coefficients have values constrained by a power normalization factor of the (re)configurable antennas.

13. The method of claim 10, further comprising receiving a wireless electromagnetic signal with M receiver antennas, the wireless electromagnetic signal having the matrix encoded thereon, and decoding the matrix.

14. The method of claim 13, wherein the matrix is decoded using a maximum likelihood decoder including coefficients identical to those in the matrix.

15. The method of claim 14, wherein decoding the matrix comprises computing an intermediate signal from the wireless electromagnetic signal, channel parameters and parameters of the (re)configurable antennas (and optionally, a power normalization factor of the (re)configurable antennas), estimating a first symbol of the codeword from the intermediate signal, and computing a most likely codeword from the intermediate signal and the estimated first symbol.

16. The method of claim 15, wherein computing the most likely codeword comprises computing a cost function for a next symbol in the codeword, and selecting a computed codeword with a minimum cost function as the most likely codeword.

17. A multiple-input multiple-output (MIMO) wireless communication system, comprising:
   a) M (re)configurable antennas configured to independently transmit or broadcast wireless electromagnetic signals having a frequency in the microwave or optical range, wherein M is an integer of at least 2;
   b) a controller configured to control a position and/or transmission direction of each of the (re)configurable antennas; and
   c) an encoder configured to encode information onto the wireless electromagnetic signals, wherein the information comprises codewords having N symbols, N is an integer of at least 2, and the codewords are expressed in an N×M matrix having a non-zero determinant and in which each of the symbols is associated with a coefficient configured to maximize diversity and/or coding gain.

18. The MIMO wireless communication system of claim 17, wherein a first one of the coefficients is a design parameter value providing a lowest bit error rate when decoding the codewords, and a second one of the coefficients is the first one of the coefficients multiplied by $-(-1)^{1/2}$ or a mathematical equivalent thereof.

19. The MIMO wireless communication system of claim 17, further comprising M receivers configured to receive incoming wireless electromagnetic signals having information encoded thereon, the information on the incoming wireless electromagnetic signals comprising codewords, a matrix and at least one coefficient encoded in an identical manner as the information encoded by the encoder.

20. The MIMO wireless communication system of claim 17, wherein the coefficient is a design parameter value providing a lowest bit error rate when decoding the codewords.

* * * * *